United States Patent
Kaneshige

(10) Patent No.: US 10,819,179 B2
(45) Date of Patent: Oct. 27, 2020

(54) STATOR OF ROTARY ELECTRIC MACHINE AND METHOD OF MANUFACTURING THE SAME

(71) Applicant: TOYOTA JIDOSHA KABUSHIKI KAISHA, Toyota-shi, Aichi-ken (JP)

(72) Inventor: Keiichi Kaneshige, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 16/130,125

(22) Filed: Sep. 13, 2018

(65) Prior Publication Data

US 2019/0097484 A1    Mar. 28, 2019

(30) Foreign Application Priority Data

Sep. 28, 2017    (JP) .................... 2017-188394

(51) Int. Cl.
| | |
|---|---|
| H02K 3/48 | (2006.01) |
| H02K 15/00 | (2006.01) |
| H02K 15/02 | (2006.01) |
| H02K 3/50 | (2006.01) |

(52) U.S. Cl.
CPC ............. *H02K 3/48* (2013.01); *H02K 3/50* (2013.01); *H02K 15/0068* (2013.01); *H02K 15/026* (2013.01)

(58) Field of Classification Search
CPC .... H02K 15/0068; H02K 15/026; H02K 3/48; H02K 3/50
USPC .................................................. 310/179, 71
See application file for complete search history.

(56) References Cited

U.S. PATENT DOCUMENTS

| | | | | |
|---|---|---|---|---|
| 6,072,259 A | * | 6/2000 | Kawabata | H02K 3/38 310/216.049 |
| 7,430,796 B2 | * | 10/2008 | Baumgartner | H02K 3/522 29/605 |
| 2008/0054749 A1 | * | 3/2008 | Koike | H02K 3/522 310/179 |
| 2008/0238226 A1 | * | 10/2008 | Miyamoto | H02K 3/47 310/71 |
| 2013/0020900 A1 | * | 1/2013 | Takeuchi | B60L 50/20 310/214 |
| 2016/0190891 A1 | | 6/2016 | Masugi et al. | |
| 2017/0110929 A1 | * | 4/2017 | Egami | H02K 5/225 |

FOREIGN PATENT DOCUMENTS

| | | | |
|---|---|---|---|
| CN | 105743259 A | 7/2016 | |
| JP | 2016-36203 A | 3/2016 | |
| WO | WO-2016036066 A1 * | 3/2016 | ............... H02K 3/32 |

* cited by examiner

*Primary Examiner* — Forrest M Phillips
(74) *Attorney, Agent, or Firm* — Oliff PLC

(57) ABSTRACT

A stator of a rotary electric machine in which a power line to be connected to a coil can be fixed stably without requiring an additional part. The stator of a rotary electric machine has a stator core which has a plurality of radially protruded teeth at intervals in a circumferential direction; three-phase coils which are wound around the teeth and which each have a coil end protruding from an axial end face of the stator core; power lines which are respectively connected to three input-side ends of the three-phase coils via a joint part; and a resin mold which integrally fixes the coil end and the joint part.

9 Claims, 4 Drawing Sheets

STATOR OF ROTARY ELECTRIC MACHINE AND METHOD OF MANUFACTURING THE SAME

CROSS REFERENCE TO RELATED APPLICATION

The disclosure of Japanese Patent Application No. 2017-188394 filed on Sep. 28, 2017 including the specification, claims, drawings, and abstract is incorporated herein by reference in its entirety.

TECHNICAL FIELD

The present disclosure relates to a stator of a rotary electric machine and to a method of manufacturing the same.

BACKGROUND

JP 2016-36203 A discloses a stator of a rotary electric machine having a structure in which three power lines respectively connected to input-side ends of three-phase coils are passed through a power line fastening member, and the power line fastening member is fixed to the stator core by two supporting brackets.

SUMMARY

Technical Problem

The stator of the rotary electric machine described in JP 2016-36203 A has three power lines stably fixed to the stator core by the power line fastening member and the supporting brackets but the structure becomes complicated because additional parts such as the power line fastening member and the supporting brackets are required.

The present disclosure provides a stator of a rotary electric machine in which a power line to be connected to a coil can be fixed stably without requiring an additional part.

Solution to Problem

A stator of a rotary electric machine according to an aspect of the present disclosure comprises a stator core which has a plurality of radially protruded teeth at intervals in a circumferential direction; three-phase coils which are wound around the teeth and which each have a coil end protruding from an axial end face of the stator core; power lines which are respectively connected to three input-side ends of the three-phase coils via a joint part; and a resin mold which integrally fixes the coil end and the joint part.

According to this configuration, provision of the resin mold that integrally fixes the coil ends and the joint parts eliminates necessity of an additional part such as a power line fastening member or a supporting bracket, and the power lines can be fixed stably via the joint parts by means of a simple structure.

In the stator of a rotary electric machine according to this disclosure, the joint part of respective phase coils is placed away radially outward from the coil end; the resin mold has a coil end fixing portion which is provided to cover the coil end and a joint part fixing portion which is provided to cover the joint part; and the joint part fixing portion is integrally formed to protrude outward radially from the coil end fixing portion.

According to this configuration, the joint part placed away outwards in the radial direction from the coil ends can be fixed stably by a joint part fixing portion which is formed integrally with the coil end fixing portion provided to cover the coil end.

In this case, the joint part fixing portion of the resin mold is separately protruded for each joint part of the respective phase coils. According to this configuration, the used amount of the resin material composing the resin mold can be suppressed effectively.

In addition, the joint part fixing portion of the resin mold may be formed continuously in the circumferential direction so as to collectively fix the joint parts of the respective phase coils. According to this configuration, the joint part fixing portion for collectively fixing the joint parts of the respective phase coils is formed continuously in the circumferential direction, so that strength of the joint part fixing portion is increased and the power lines can be fixed more stably.

A manufacturing method of a stator of a rotary electric machine according to another aspect of the present disclosure comprises the steps of preparing a stator core having a plurality of teeth; winding a coil around the stator core; joining a power line to an input-side end of the coil; and molding to form a resin mold for integrally fixing a coil end protruding from an axial end face of the stator core in the coil and a joint part of the input-side end of the coil and the power line; wherein the molding step is performed by downwardly immersing the coil end and the joint part into a resin material stored in a mold groove.

This manufacturing method eliminates necessity of an additional part such as a power line fastening member or a supporting bracket by forming the resin mold for integrally fixing the coil end and the joint part and can manufacture the stator of a rotary electric machine in which the power line can be stably fixed via the joint part by means of a simple structure. In addition, the molding step for the resin mold is performed by downwardly immersing the coil end and the joint part into a resin material stored in a mold groove, so that it is not necessary to have a complex metal mold structure which prevents leakage of the resin material from between the coil conductor wire and the metal mold, and the cost of the metal mold can be suppressed.

Advantageous Effects of Invention

According to the present disclosure, the stator of a rotary electric machine in which there can be provided a power line to be connected to a coil can be fixed stably without requiring an additional part.

BRIEF DESCRIPTION OF DRAWINGS

Embodiment(s) of the present disclosure will be described by reference to the following figures, wherein.

DESCRIPTION OF EMBODIMENTS

Embodiments of the present disclosure are described below in detail with reference to the drawings. In the description, specific forms, materials, numerical values, directions, etc. are illustrative examples to facilitate understanding of the present disclosure and can be appropriately changed in accordance with uses, purposes, specifications, etc. It is initially presumed that if plural embodiments and modifications are included in the following description, their characteristic portions are used in appropriate combination.

Figure 1:
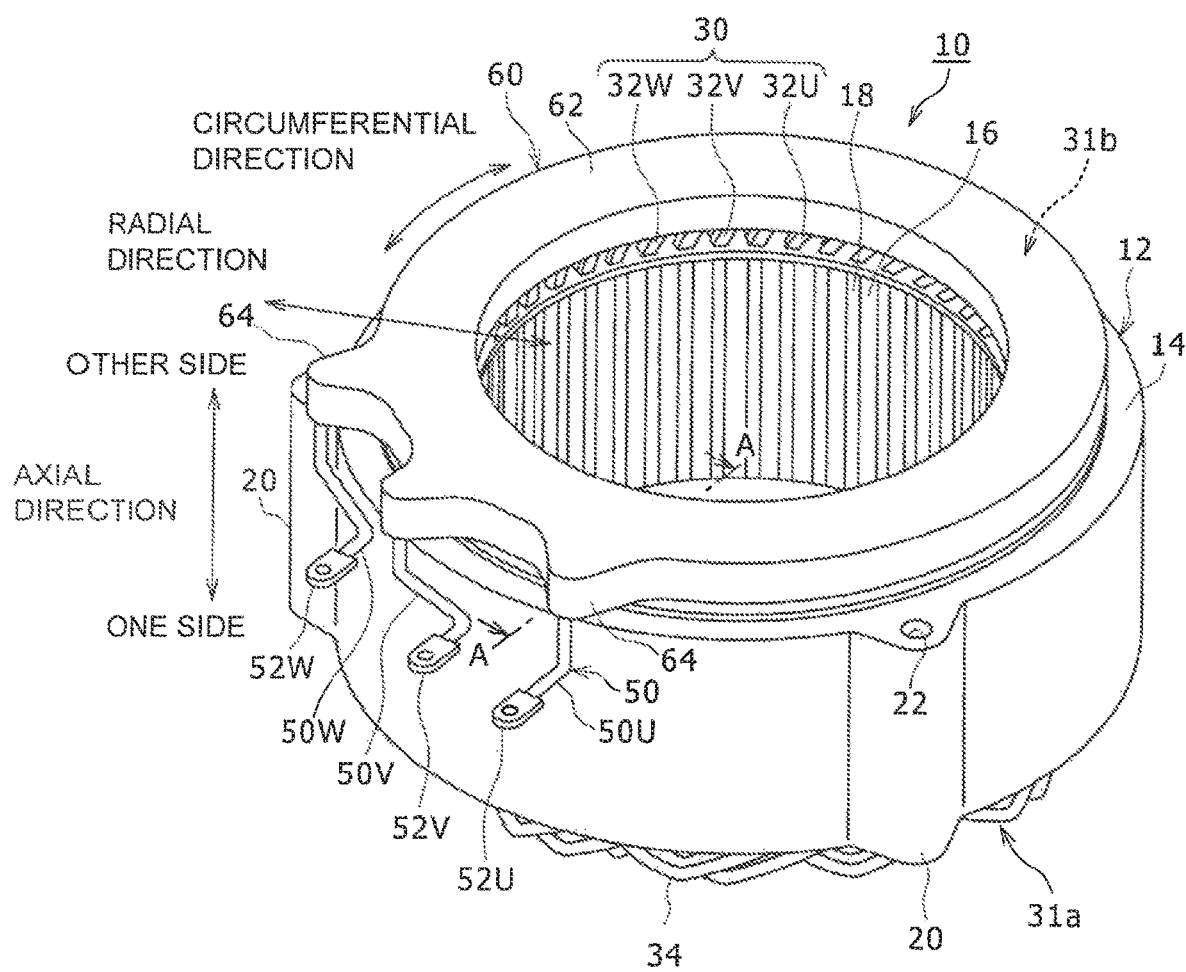
FIG. 1 is a perspective view of a stator of a rotary electric machine according to an embodiment of the present disclosure.
Figure 2:
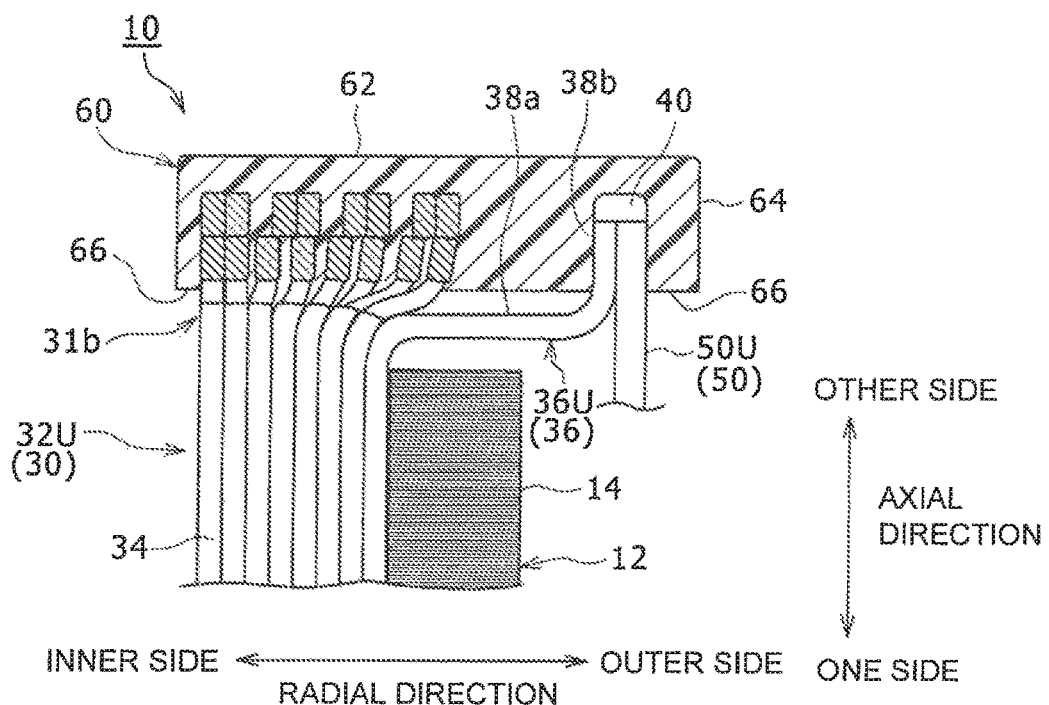
FIG. 2 is a view partly showing a sectional view taken along line A-A in FIG. 1.

FIG. 1 is a perspective view of a stator 10 of a rotary electric machine in one embodiment of the present disclosure, and FIG. 2 is a view partly showing a sectional view taken along line A-A in FIG. 1. The stator 10 of the rotary electric machine is simply referred to as "stator 10" below.

As shown in FIG. 1, the stator 10 comprises a stator core 12, a coil 30 wound around the stator core 12, a power line 50 connected to the coil 30, and a resin mold 60 which is provided to cover a coil end of the coil 30. A cylindrical space is formed within the stator 10 and an unillustrated rotor is provided rotatably within the space to configure a rotary electric machine.

The stator core 12 is a magnetic part having an approximately cylindrical shape. For example, the stator core 12 is formed by axially stacking and integrally joining magnetic thin plates such as electromagnetic steel sheets. Moreover, the stator core 12 includes an annular yoke 14 which extends along a circumferential direction, and a plurality of teeth 16 which protrude inwardly in the radial direction from the inner peripheral surface of the yoke 14. The plurality of teeth 16 are arranged mutually at (equal) intervals in the circumferential direction. A slot 18 is formed between two teeth 16 which are adjacent to each other in the circumferential direction. The slot 18 is formed in the shape of a groove which is open toward the inner side in a radial direction and open on both sides in the axial direction.

Fitting portions 20 are formed on the outer peripheral surface of the stator core 12. The fitting portions 20 are formed to extend in the axial direction of the stator 10 and to protrude outward radially. In this embodiment, three fitting portions 20 are arranged at equal intervals in the circumferential direction (only two are shown in FIG. 1). Each of the fitting portions 20 has a through hole 22 extending in an axial direction. The stator 10 is fixed to a casing (not shown) by bolts (not shown) passed through the through holes 22.

The coil 30 is wound around the teeth 16 of the stator core 12. The coil 30 has coil ends 31a, 31b protruded from the axial end faces of the stator core 12. In this embodiment, the coil 30 is composed of segment coils which are wound around the stator core 12 by distributed winding. The coil may be wound around the teeth of the stator core by concentrated winding.

The segment coil is composed of a number of segment conductor wires 34 made of a flat conductor wire having a substantially U-shaped cross section. The segment conductor wires 34 are covered with an insulation coating excepting the tip ends of two linear portions. For example, the segment coil is composed as follows. The two linear portions of the segment conductor wires 34 are inserted from an axial one side into two slots 18 which are separated by a prescribed number of slots 18 in the circumferential direction. Subsequently, the tip ends of the linear portions protruded from the slots 18 on the axial other side are bent so as to come close to another segment conductor wire. In addition, the tip ends of the linear portions are connected by welding or the like to the tip ends of the linear portions of other segment conductor wires which are mutually adjacent in the radial direction.

Thus, there is composed a segment coil which is wound over the plurality of teeth 16 separated by the prescribed number of slots 18.

In addition, the coil 30 includes three-phase coils, namely a U-phase coil 32U, a V-phase coil 32V, and a W-phase coil 32W. The U-phase coil 32U is composed of a plurality of segment coils which are connected in series by a crossover wire (or a bus bar) or the like. The V-phase coil 32V and the W-phase coil 32W are also composed of a plurality of segment coils which are connected in series by a crossover wire (or a bus bar) or the like.

One ends of the individual phase coils 32U, 32V, 32W are electrically connected to each other at a neutral point (not shown). On the other hand, the other ends (input-side ends) of the individual phase coils 32U, 32V, 32W are pulled out radially and connected to respective ends of power lines 50U, 50V, 50W for the respective phase coils.

Terminals 52U, 52V, 52W are connected to the other ends of the power lines 50U, 50V, 50W of the respective phases. These terminals 52U, 52V, 52W are connected to an external electric circuit such as an inverter (not shown). Accordingly, a three-phase AC voltage is applied to the coil 30 from the external electric circuit.

As shown in FIG. 2, a leader line 36U which is an input-side end of the U-phase coil 32U has a radial portion 38a which extends outward radially from the inner circumference side of the stator core 12, and an axial portion 38b which is bent along the axial direction. The tip end of the axial portion 38b of the leader line 36U is connected to one end of the U-phase power line 50U via a joint part 40. For example, the joint part 40 is formed by welding or the like. The U-phase power line 50U is extended from the joint part 40 along the axial portion 38b of the leader line 36U, bent at about 90° as shown in FIG. 1, and extended to the other end to which the terminal 52U is coupled.

The leader lines of the V-phase coil 32V and the W-phase coil 32W are connected to one ends of the V-phase power line 50V and the W-phase power line 50W via the joint part 40 in the same way as the above-described U-phase coil 32U. As shown in FIG. 1 and FIG. 2, the joint parts 40 for the leader lines 36 of the individual phase coils 32U, 32V, 32W and the individual phase power lines 50U, 50V, 50W are placed away radially outward from the coil end 31b and arranged at intervals in the circumferential direction. The joint parts 40 are placed outside in the radial direction from the outer peripheral surface of the stator core 12.

The stator 10 in this embodiment has the resin mold 60. The resin mold 60 integrally fixes the coil end 31b of the coil 30, and the joint part 40 of the respective phase coils 32U, 32V, 32W and the power line 50. For example, the resin mold 60 is suitably composed of an insulating resin such as varnish. However, this is not limitative, and the resin mold 60 may also be composed of a thermosetting resin, such as an epoxy resin.

The resin mold 60 has a coil end fixing portion 62 which has an annular shape and covers the coil end 31b, and joint part fixing portions 64 which are integrally formed to protrude outward in the radial direction from the coil end fixing portion 62 to cover the joint parts 40. The coil end fixing portion 62 has a function to improve electric insulation among the respective phase coils 32U, 32V, 32W by covering the welded portions of the adjacent tip ends of the segment conductor wires 34 constituting the coil 30 by the insulating resin. In this embodiment, three joint part fixing portions 64 are separately protruded in a substantially U shape as viewed in the axial direction for each joint part 40 of the power lines 50 of the respective phase coils 32U, 32V, 32W. Thus, the resin mold 60 integrally fixes the coil end 31b with the joint part 40 of the power line 50 of the respective phase coils 32U, 32V, 32W, and the power line 50 can be fixed stably via the joint part 40 by means of a simple structure without necessity of an additional part such as a power line fastening member or a supporting bracket. As a result, when a rotary electric machine having the stator 10 is mounted and operated on a vehicle or the like, breakage of the joint part 40 dues to resonance of the power line 50 can be effectively prevented. In addition, three joint part fixing portions 64 are separately protruded for each joint part 40 of the power line 50 of the respective phase coils 32U, 32V, 32W, so that the used amount of the resin material composing the resin mold 60 can be suppressed effectively.

The resin mold 60 has a surface 66 which is formed flat and faces the stator core 12. This is because the surface 66 is defined and formed by the surface of a liquid resin material stored within a mold groove when the resin mold 60 is molded as described later.

Figure 3:
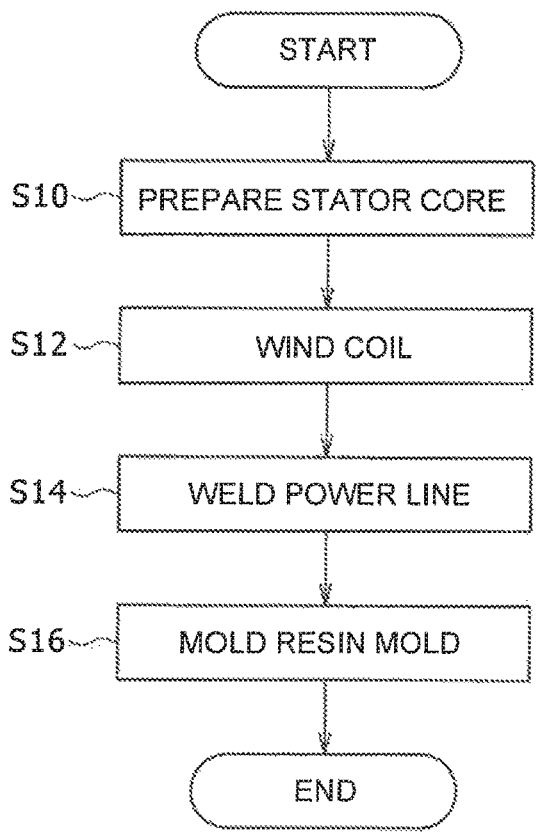
FIG. 3 is a flowchart showing a process for manufacturing the stator of a rotary electric machine.

Next, a method for manufacturing the stator 10 is described with reference to FIG. 3, FIG. 4A, and FIG. 4B. FIG. 3 is a flowchart showing a process for manufacturing the stator 10, and FIG. 4A and FIG. 4B are views showing a state of molding the resin mold 60.

FIG. 3 shows that the stator core 12 is prepared first (Step S10). Next, the coil 30 is wound around the stator core 12 (Step S12). Subsequently, the power lines 50U, 50V, 50W are respectively welded to an input-side end of the respective phase coils 32U, 32V, 32W of the coil 30 (Step S14). Subsequently, the resin mold 60 is molded to integrally cover the coil end 31b on the axially other side and the joint part 40 (Step S16).

Figure 4A:
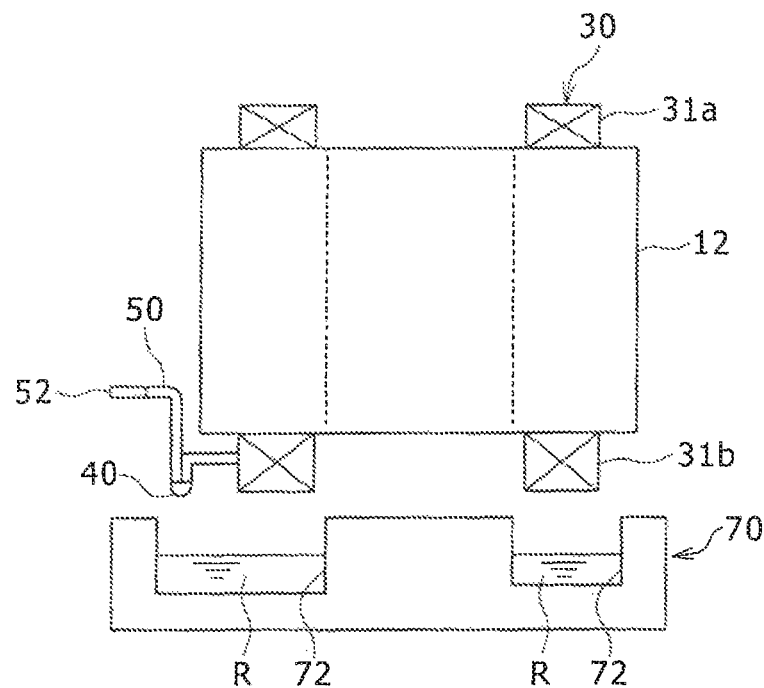
FIG. 4A is a view showing a state in which a resin mold is molded.
Figure 4B:
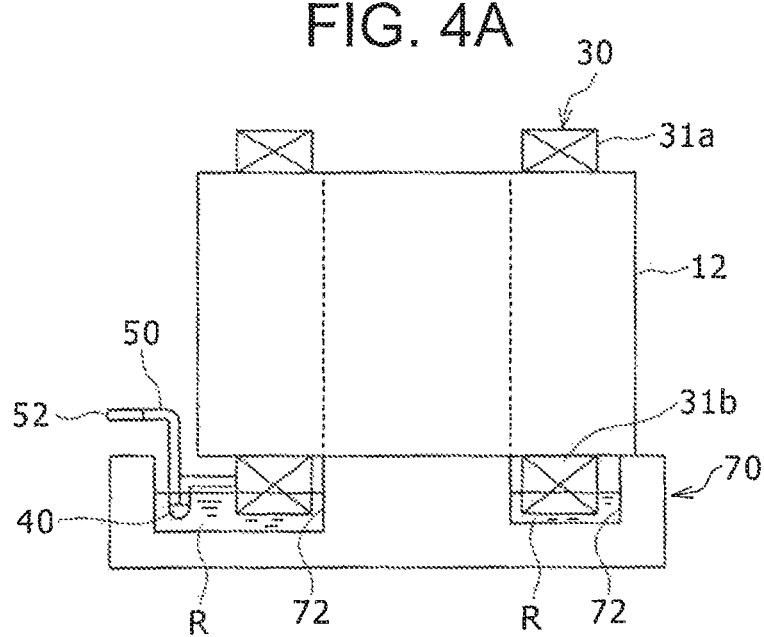
FIG. 4B is a view showing a subsequent state of FIG. 4A in which the resin mold is molded.

As shown in FIG. 4A, a liquid resin material R is stored in a mold groove 72 which is formed to have an annular shape in a metal mold 70. In this state, the coil end 31b of the stator core 12 around which the coil 30 is wound and the joint part 40 are directed downward, and the coil end 31b and the joint part 40 are immersed (or dipped) down into the resin material within the mold groove 72 as shown in FIG. 4B. After the resin material R is cured, the metal mold 70 is removed.

Thus, the resin mold 60 is molded by dipping the coil end 31b and the joint part 40 into the resin material R. Therefore, it is not necessary to have a complex mold structure so that the resin material R does not leak from between the segment conductor wire 34 forming the coil 30 and the metal mold 70, and the cost of the metal mold can be suppressed.

It is to be noted that the stator of the rotary electric machine according to the present disclosure is not limited to the above-described embodiment and its modifications and can be modified and improved in various ways.

Figure 5:
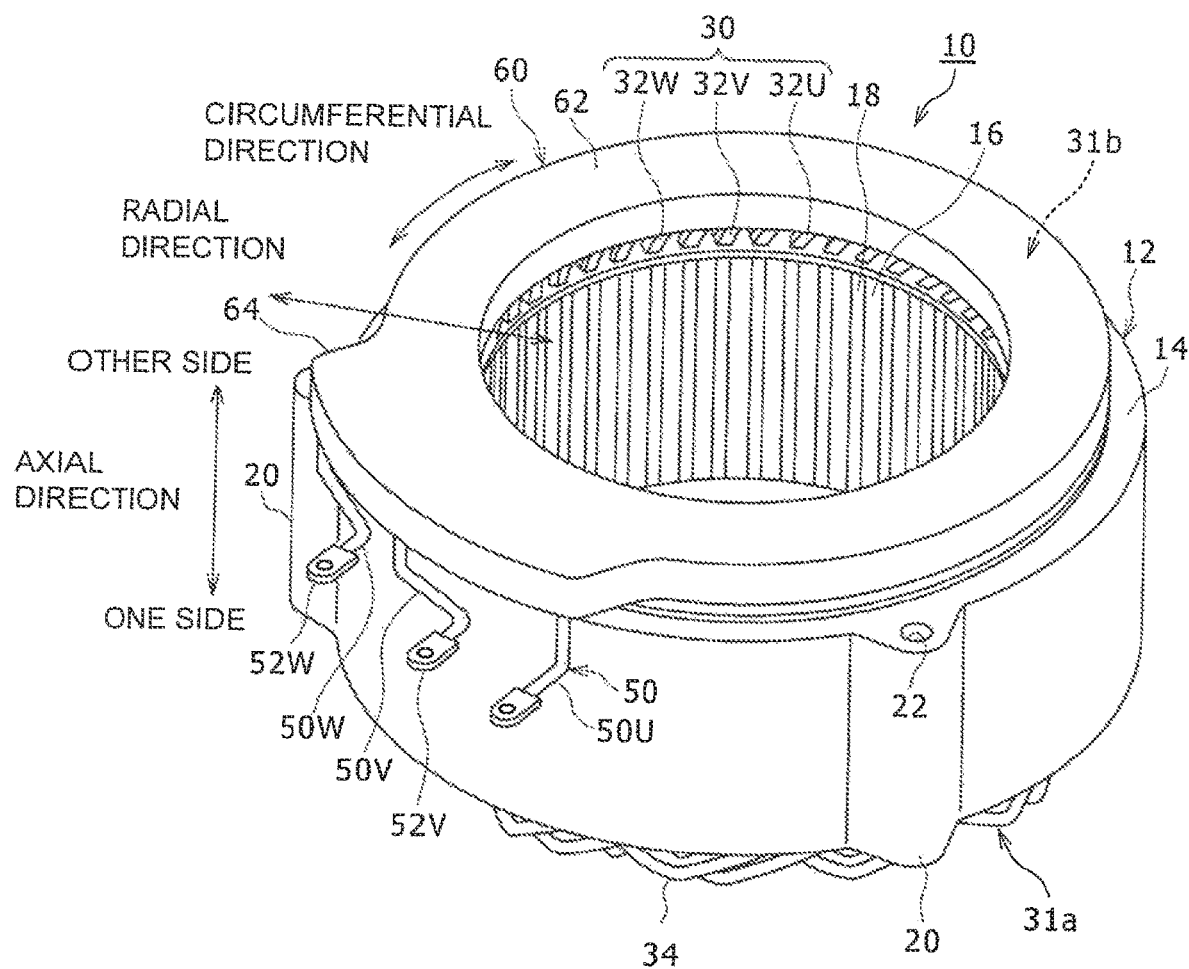
FIG. 5 is a perspective view showing a stator of a rotary electric machine of a modified embodiment.

The above-described example separately protrudes the joint part fixing portions 64 of the resin mold 60 for each joint 40 of the respective phase coils 32U, 32V, 32W, but this is not limitative. For example, as shown in FIG. 5, the joint part fixing portion 64 of the resin mold 60 may be formed continuously in the circumferential direction so as to collectively fix the three joint parts 40 of the respective phase coils 32U, 32V, 32W. Consequently, strength of the joint part fixing portion 64 is increased, and the power line 50 can be fixed more stably.

REFERENCE SIGNS LIST

10 Stator of rotary electric machine; 12 Stator core; 14 Yoke, 16 Teeth; 18 Slot; 20 Fitting portion; 22 Through hole; 30 Coil (three-phase coil); 31a, 31b Coil end; 32U U-phase coil; 32V V-phase coil; 32W W-phase coil; 34 Segment conductor wire; 36 Leader line (input-side end); 38a Radial portion; 38b Axial portion; 40 Joint part; 50 Power line; 50U U-phase power line; 50V V-phase power line; SOW W-phase power line; 52U, 52V, 52W Terminal; 60 Resin mold; 62 Coil end fixing portion; 64 Joint part fixing portion; 66 Surface; 70 Metal mold; 72 Mold groove; R Resin material

The invention claimed is:

1. A stator of a rotary electric machine, comprising:
a stator core which has a plurality of radially protruded teeth at intervals in a circumferential direction;
three-phase coils which are wound around the teeth and which each have a coil end protruding from an axial end face of the stator core;
power lines which are respectively connected to three input-side ends of the three-phase coils via respective joint parts; and
a resin mold which integrally fixes the coil end and the joint parts; wherein
each of the three input side ends includes a radial portion which extends outward radially from the inner circumference side of the stator core, and an axial portion which extends in a direction away from the axial end face of the stator core,
the axial portion and a power line extending along the axial portion are connected at the joint part, and
the radial portion is located away from the resin mold.

2. The stator according to claim 1, wherein the joint parts of the three respective phase coils are placed away radially outward from the coil end; the resin mold has a coil end fixing portion which is provided to cover the coil end and a joint part fixing portion which is provided to cover the joint parts; and the joint part fixing portion is integrally formed to protrude outward radially from the coil end fixing portion.

3. The stator according to claim 2, wherein the joint part fixing portion of the resin mold is separately protruded for each joint part of the respective phase coils.

4. The stator according to claim 2, wherein the joint part fixing portion of the resin mold is formed continuously in the circumferential direction so as to fix collectively the joint parts of the respective phase coils.

5. The stator according to claim 1, wherein the joint parts are outside in the radial direction from an outer peripheral surface of the stator core.

6. The stator according to claim 5, wherein the outer peripheral surface of the stator core is a most radially outward surface of the stator core and radially inward of a radially outward surface of the resin mold.

7. A manufacturing method of a stator of a rotary electric machine comprising the steps of:
preparing a stator core having a plurality of teeth;
winding a coil around the stator core;
joining a power line to an input-side end of the coil; and
molding to form a resin mold for integrally fixing a coil end protruding from an axial end face of the stator core in the coil and a joint part of the input-side end of the coil and the power line; wherein:
the molding step is performed by downwardly immersing the coil end and the joint part into a resin material stored in a mold groove;
each of the three input side ends includes a radial portion which extends outward radially from the inner circumference side of the stator core, and an axial portion which extends in a direction away from the axial end face of the stator core, the axial portion and a power line extending along the axial portion are connected at the joint part, and the radial portion is located away from the resin mold.

8. The manufacturing method according to claim 7, wherein the joint part is outside in the radial direction from an outer peripheral surface of the stator core.

9. The manufacturing method according to claim 8, wherein the outer peripheral surface of the stator core is a most radially outward surface of the stator core and radially inward of a radially outward surface of the resin mold.

* * * * *